(12) United States Patent
Boehm et al.

(10) Patent No.: US 11,033,966 B2
(45) Date of Patent: Jun. 15, 2021

(54) FLOW-CONDUCTING COMPONENT

(71) Applicant: KSB Aktiengesellschaft, Frankenthal (DE)

(72) Inventors: Alexander Boehm, Frankenthal (DE); Holger Rauner, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 245 days.

(21) Appl. No.: 15/550,504

(22) PCT Filed: Feb. 9, 2016

(86) PCT No.: PCT/EP2016/052706
§ 371 (c)(1),
(2) Date: Aug. 11, 2017

(87) PCT Pub. No.: WO2016/128388
PCT Pub. Date: Aug. 18, 2016

(65) Prior Publication Data
US 2018/0236595 A1 Aug. 23, 2018

(30) Foreign Application Priority Data
Feb. 11, 2015 (DE) .................... 10 2015 202 417.2

(51) Int. Cl.
*B22F 5/10* (2006.01)
*B22F 10/20* (2021.01)
(Continued)

(52) U.S. Cl.
CPC ............... *B22F 10/20* (2021.01); *B22F 5/10* (2013.01); *B33Y 10/00* (2014.12); *B33Y 80/00* (2014.12);
(Continued)

(58) Field of Classification Search
None
See application file for complete search history.

(56) References Cited

U.S. PATENT DOCUMENTS

| 5,082,425 A | 1/1992 | Reil et al. |
| 5,207,560 A | 5/1993 | Urban |

(Continued)

FOREIGN PATENT DOCUMENTS

| CH | 705 631 A1 | 5/2013 |
| CN | 101391302 A | 3/2009 |

(Continued)

OTHER PUBLICATIONS

International Preliminary Report on Patentability (PCT/IB/338 & PCT/IB/373) issued in PCT Application No. PCT/EP2016/052706 dated Aug. 24, 2017, including English translation of document C3 (German-language Written Opinion (PCT/ISA/237)) previously filed on Aug. 11, 2017 (9 pages).

(Continued)

*Primary Examiner* — Xiaobei Wang
(74) *Attorney, Agent, or Firm* — Crowell & Moring LLP

(57) ABSTRACT

A flow-conducting component having at least one functional region for contact with a flowing medium and at least one functional region having supporting characteristics is provided. The two functional regions are produced from a material by successively solidifying layers using radiation in a manner that provides different material characteristics in the different functional regions.

6 Claims, 3 Drawing Sheets

(51) Int. Cl.
    *B33Y 10/00*     (2015.01)
    *F04D 29/02*     (2006.01)
    *F04D 29/22*     (2006.01)
    *B33Y 80/00*     (2015.01)
    *F04D 29/42*     (2006.01)

(52) U.S. Cl.
    CPC ........... *F04D 29/026* (2013.01); *F04D 29/22* (2013.01); *F04D 29/2227* (2013.01); *F04D 29/426* (2013.01); *F05D 2230/22* (2013.01); *F05D 2230/31* (2013.01); *Y10T 428/12014* (2015.01); *Y10T 428/12028* (2015.01)

(56) References Cited

U.S. PATENT DOCUMENTS

| | | | |
|---|---|---|---|
| 2003/0170120 A1* | 9/2003 | Grunke | F01D 5/20 |
| | | | 415/174.4 |
| 2009/0165989 A1* | 7/2009 | Ebisu | B22D 11/11 |
| | | | 164/498 |
| 2013/0108460 A1 | 5/2013 | Szwedowicz et al. | |
| 2014/0099476 A1 | 4/2014 | Subramanian et al. | |
| 2014/0163717 A1 | 6/2014 | Das et al. | |
| 2015/0003997 A1 | 1/2015 | Mironets et al. | |
| 2015/0267543 A1* | 9/2015 | Gerber | B22F 5/009 |
| | | | 416/212 R |
| 2016/0214211 A1* | 7/2016 | Gregg | B22F 3/11 |

FOREIGN PATENT DOCUMENTS

| | | |
|---|---|---|
| DE | 37 31 161 A1 | 5/1989 |
| DE | 40 31 936 A1 | 4/1992 |
| EP | 1 995 411 A2 | 11/2008 |
| EP | 2 584 146 A1 | 4/2013 |
| EP | 2 737 965 A1 | 6/2014 |
| WO | WO 2010/098479 A1 | 9/2010 |
| WO | WO 2013/124314 A1 | 8/2013 |

OTHER PUBLICATIONS

English translation of Chinese Office Action issued in counterpart Chinese Application No. 201680009702.3 dated Feb. 15, 2019 (six (6) pages).
German-language Search Report issued in counterpart German Application No. 10 2015 202 417.2 dated Oct. 22, 2015 (4 pages).
International Search Report (PCT/ISA/210) issued in PCT Application No. PCT/EP2016/052706 dated Apr. 11, 2016 with English translation (7 pages).
German-language Written Opinion (PCT/ISA/237) issued in PCT Application No. PCT/EP2016/052706 dated Apr. 11, 2016 (6 pages).
English language Translation of Japanese-language Office Action issued in counterpart Japanese Application No. 2017-541682 dated Nov. 19, 2019 (four (4) pages).

* cited by examiner

FLOW-CONDUCTING COMPONENT

CROSS REFERENCE TO RELATED APPLICATIONS

This application is a continuation of PCT International Application No. PCT/EP2016/052706, filed Feb. 9, 2016, which claims priority under 35 U.S.C. § 119 from German Patent Application No. 10 2015 202 417.2, filed Feb. 11, 2015, the entire disclosures of which are herein expressly incorporated by reference.

BACKGROUND AND SUMMARY OF THE INVENTION

The invention relates to a flow-conducting component with at least one functional region for contact with a flowing medium and at least one functional region with load-bearing characteristics.

Such flow-conducting components can be parts of centrifugal pumps, for example impellers or pump casings, or parts of valves, for example shut-off bodies or valve housings.

An impeller also needs to have load-bearing characteristics, since it is arranged in the housing of a centrifugal pump and is driven by a shaft. Furthermore, the surfaces of the impeller, which come into contact with the medium to be delivered, especially the impeller edges, have to be particularly wear-resistant. This is especially the case when the impeller is used for delivering media with solid material content. Solid particles lead to wear on the impeller. Also, the impeller has to be resistant to cavitation which possibly occurs.

In this case, the functional region with the load-bearing characteristics is to have a high degree of strength and a low degree of brittleness. In contrast to this, functional regions of the impeller which come into contact with the medium to be delivered and are therefore abrasively stressed are to be constructed from a hard, wear-resistant material.

In the case of conventional impellers, this is achieved by coatings, for example, in the case of which the functional region of the impeller with the load-bearing characteristics is produced from a material with a low degree of brittleness with high strength. A coating consisting of another chemical material, for example by stelliting, is then applied to this functional region. Considerable costs, high expenditure of effort and limited recyclability are associated with this.

Described in German Patent Publication No. DE 37 31 161 A1 is a centrifugal pump impeller which is assembled from a plurality of sheet metal parts. For achieving a stiff construction, the energy-transmitting vanes are fastened exclusively on the force-transmitting cover disk. A suction opening, which is designed as an individual part, forms the intake region of the impeller. The suction opening covers the vane entries. A vane-less cover disk which covers the vane passages is fastened to the vanes between the impeller exit and the maximum diameter of the suction opening.

DE 40 31 936 A1 relates to a multipart diffuser, consisting of different materials, for centrifugal pumps. According to the materials being used, different expansion coefficients result in the event of thermal loads. Of the fit clearance points of the diffuser which are effective in the radial direction, only one fit clearance point is ever in dependence of the respective temperature. In the cold operating state, it is the fit clearance point located on the smaller diameter, whereas in the hot operating state it is the fit clearance point located on the larger diameter.

It is an object of the invention to disclose a flow-conducting component which has functional regions with different characteristics. In this case, the surfaces and edges of the flow-conducting component which come into contact with the medium to be delivered are to be particularly wear-resistant and are also to withstand cavitation. Furthermore, the component is to have functional regions which have particularly advantageous load-bearing characteristics. The flow-conducting component is to be distinguished by a long service life and a reliable principle of operation. Furthermore, damage as a result of different thermal expansion coefficients is to be avoided. Also, the component is to be distinguished by good recyclability.

According to the invention, the different functional regions of the flow-conducting component are produced from a construction material by consecutive melting and solidifying of layers by radiation. The different characteristics of the individual functional regions of the flow-conducting component are generated in this case by variations of the radiation. By targeted controlling of the local heat input, a modification of the material characteristics is already undertaken during construction of the flow-conducting component. As a result, success is achieved in creating zones and structures of different material states and therefore different characteristics in a component of a chemically homogeneous material.

The flow-conducting components according to the invention have functional regions the characteristics of which are created in a targeted manner by means of generative manufacturing processes. Components such as impellers of centrifugal pumps or valve seats which have in each case different functional regions which are optimized in their specific characteristics for the respective use. The different functional regions of the flow-conducting components can have different strengths, deformabilities and resistance to wear or cavitation.

For creating the flow-conducting component, a targeted controlling of the energy input is carried out during the construction of the component for altering the mechanical properties in the micro-volume of the material. A subsequent thermal treatment is dispensed with so that the locally occurring different material states are maintained. Costly coatings are no longer necessary either.

In the case of the construction material for producing the flow-conducting component it is preferably metal powder particles. In a variant of the invention, powder particles with iron content and/or cobalt content are used for this. These can contain additives such as chromium, molybdenum or nickel.

The metallic construction material is applied in powder form to a plate in a thin layer. The powdered material is locally completely remelted by radiation at the desired places in each case and after solidification forms a solid material layer. This base plate is then lowered by the amount of a layer thickness and powder is applied again. This cycle is repeated until all the layers are remelted. The finished component is cleaned of surplus powder.

As radiation, use can be made of a laser beam, for example, which generates the flow-conducting component from the individual powder layers. The data for the guiding of the laser beam is generated on the basis of a 3D-CAD body by software. Alternatively, electron beam melting (EBM) can also be used for a selective laser melting.

The flow-conducting component which is generated in this way has functional regions according to the invention with different mechanical properties. Although the construction material for generating the component is chemically identical, different metallic structures are produced according to the invention by a variation of the radiation. As a result, a one-piece component with different metallic structures is formed.

Therefore, the energy input introduced by the radiation into the functional regions which come into contact with the medium, for example the surfaces, differs from the functional regions which have predominantly load-bearing characteristics. This can be achieved for example by variation of the intensity of the radiation. The scanning speed at which the laser beam travels over the individual powder layers also influences the energy input and therefore the resulting structure.

The functional region which has load-bearing characteristics preferably has in this case greater strength than the functional region which comes into contact with the medium.

In contrast to this, the hardness of the functional region which comes into contact with the medium is greater compared with the hardness of the functional region which has load-bearing characteristics.

Also, the tenacity and/or the elongation at breaking point of the different functional regions can be influenced in a targeted manner, using the energy input via the radiation in order to create different characteristics of the flow-conducting component.

In this case, it proves to be advantageous if the functional region with the load-bearing characteristics has a notch impact energy of more than 40 J, and the functional region which comes into contact with flowing medium has a notch impact energy of less than 10 J.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
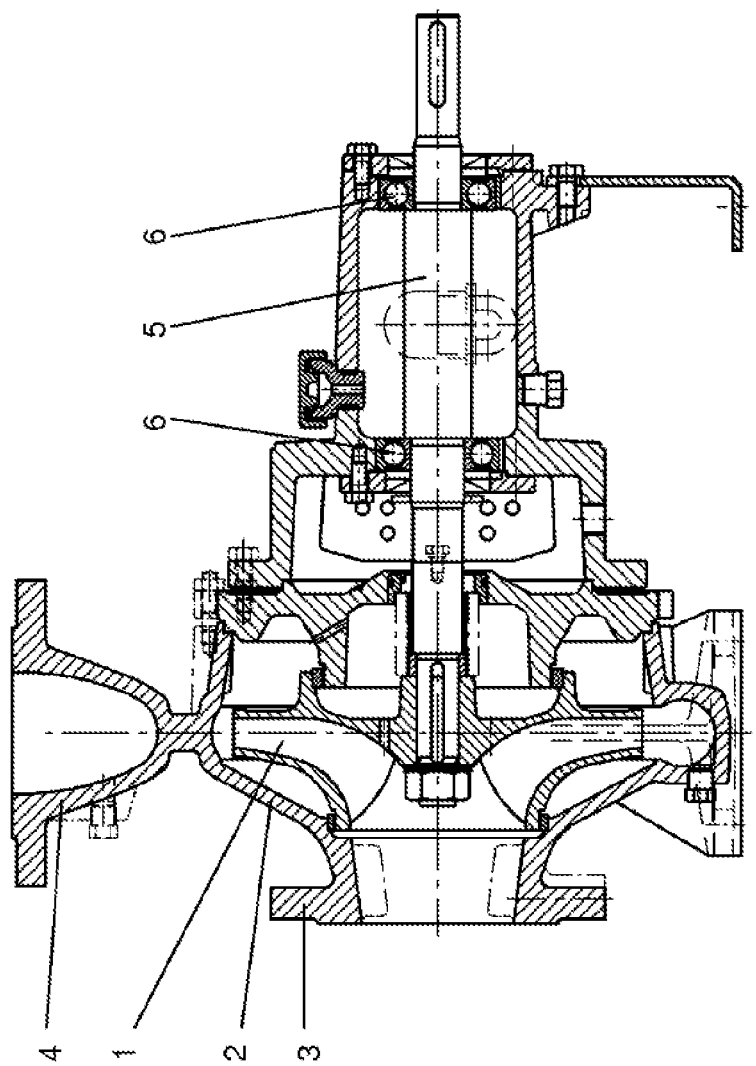
FIG. 1 shows a sectional view of a centrifugal pump arrangement in accordance with the present invention.

FIG. 1 shows a sectional view through a centrifugal pump arrangement with an impeller 1 which is arranged in a casing 2. The casing has a fluid inlet opening in the form of a suction connector 3 and a fluid outlet opening in the form of a discharge connector 4. The casing 2 in the exemplary embodiment is a spiral casing.

The impeller 1 is designed as a radial impeller and is driven by a shaft 5. The shaft 5 is made to rotate by a motor, which is not shown in this view. The shaft 5 is supported via bearings 6.

Figure 2:
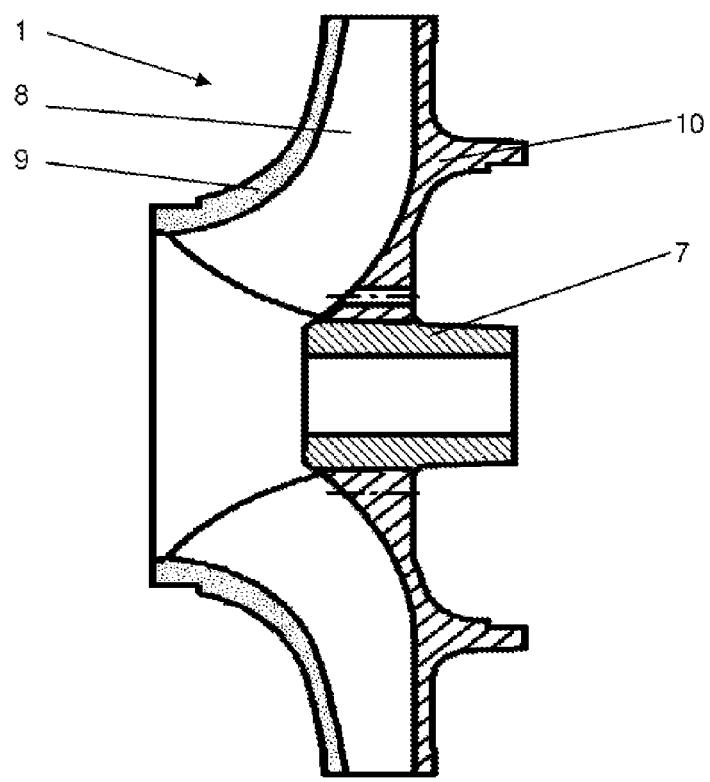
FIG. 2 shows an impeller of a centrifugal pump in accordance with the present invention.

FIG. 2 shows an impeller 1 which has a plurality of functional regions 7, 8, 9, 10. The functional region 7, which forms the hub for the shaft 5, has a high degree of strength and a low degree of brittleness.

The functional regions 8 of the impeller, which form the vanes, are provided with a high degree of hardness, however, so that this functional region is particularly resistant to wear and cavitation.

In the exemplary embodiment, the impeller features the functional regions 9 which form the cover disk, and also functional regions 10 which form the rear shroud. Each functional region is provided with characteristics which are specially geared to this application.

For generating these characteristics of the impeller, the following steps are carried out in succession:

First of all, a metal powder consisting of a ferrous material is applied to a plate in a thin layer. In the exemplary embodiment, the powder is a powder of chromium-molybdenum steel.

At the places at which the impeller is to be formed, a laser beam acts and fuses the powdered particles to each other.

After solidification, a material layer of the respective functional regions of the impeller 1 is formed.

The base plate is then lowered by the amount of the layer thickness and powder applied again.

This cycle is repeated until all the layers are remelted.

The finished component is cleaned of surplus powder.

The 3D shape of the impeller is stored as a data set in software. The laser beam is moved by a control device so that it fuses the shape of the impeller by corresponding selective fusing of the respective regions on the plate which is coated with the powder layer and these regions then solidify.

According to the invention, the energy input is varied so that different functional regions 7, 8, 9, 10 with different structures and different specific characteristics are formed so that an impeller is generated with an optimum composition. In the case of the impeller, it is a one-piece component.

Figure 3:
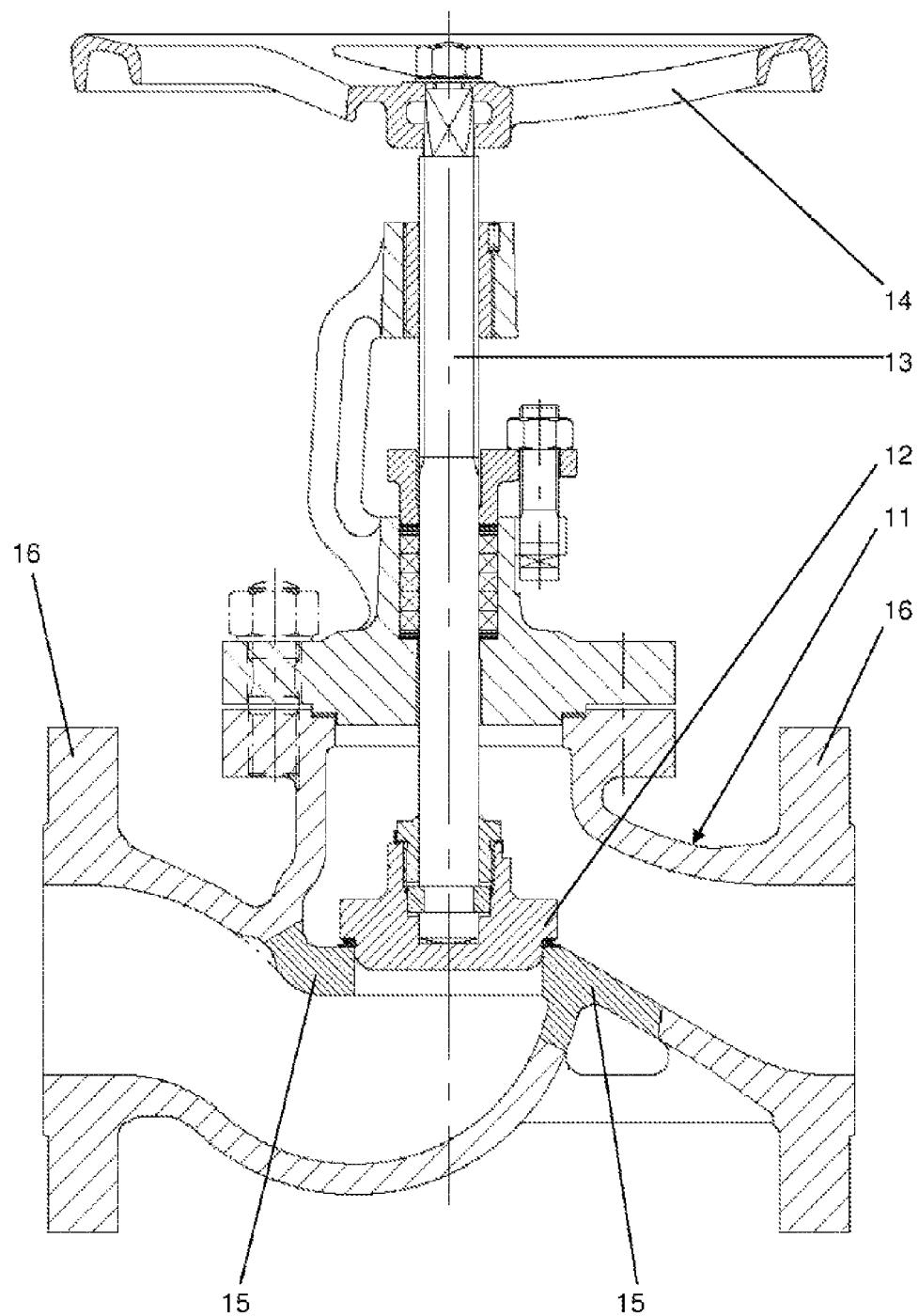
FIG. 3 shows a sectional view of a valve in accordance with the present invention.

FIG. 3 shows a sectional view of a valve. The valve has a one-piece housing 11. Arranged in the housing 11 is a shut-off body 12 which via a spindle 13 can be displaced in the vertical direction by means of a drive 14.

The functional region 15 of the one-piece housing 11 which forms the valve seat has a high degree of hardness. The functional region 16 of the one-piece housing 11, which in FIG. 3 is designed as a connecting element in the form of a flange, has a high degree of tensile strength.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a flow-conducting component having at least one flowing medium region which is configured to receive a flowing medium and at least one load-bearing region which is configured to receive a structural load on the flow-conducting component, the regions being formed from a construction material having a single chemical composition throughout the component and having different material characteristics resulting from consecutive solidification of layers of the construction material using radiation, the radiation being varied between the functional regions, comprising the steps of:

applying a layer of a construction material to a plate;
impinging the radiation upon the layer;
applying a further layer of the construction material on the preceding layer and impinging the radiation on the further layer; and
repeating the step of applying of a further layer of the construction material on the preceding layers and impinging the radiation until the flow-conducting component is complete, wherein
- the impinging of the radiation on the applied layers is varied in a manner that results in creation of the functional regions with the different material characteristics, and
- the different material characteristics include different material strengths in different functional regions and different material hardness in different functional regions,
- the at least one load-bearing region having a greater strength than the at least one flowing medium region, and the at least one flowing medium region having a greater hardness than the at least one load-bearing region,
- the at least one load-bearing region has a tensile strength of more than 600 MPa and the at least one flowing medium region has a tensile strength of less than 600 MPa,
- the at least one flowing medium functional region has a hardness in HB of more than 250, and the at least one load-bearing functional region has a hardness in HB of less than 250,
- the at least one load-bearing functional region has an elongation at breaking point of more than 10%, and
- the at least one flowing medium functional region has an elongation at breaking point of less than 10%.

2. The method for producing a flow-conducting component as claimed in claim 1, wherein
- the different material characteristics of the functional regions are produced by varying at least one of an energy input from the radiation, an intensity of the radiation, and a scanning speed of the radiation in the different functional regions.

3. The method for producing a flow-conducting component as claimed in claim 1, wherein the construction material comprises metallic powder particles.

4. The method for producing a flow-conducting component as claimed in claim 3, wherein the construction material comprises at least one of low-alloyed and high alloyed steel powder particles.

5. The flow-conducting component as claimed in claim 1, wherein the flow-conducting component formed with the functional regions is a one-piece component.

6. The method for producing a flow-conducting component as claimed in claim 1, wherein the functional regions have different structural shapes.

* * * * *